(12) United States Patent
Velicki et al.

(10) Patent No.: US 7,871,042 B2
(45) Date of Patent: Jan. 18, 2011

(54) HYDROGEN FUELED BLENDED WING BODY RING TANK

(75) Inventors: Alexander Velicki, Garden Grove, CA (US); Daniel A. Hansen, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1135 days.

(21) Appl. No.: 11/559,615

(22) Filed: Nov. 14, 2006

(65) Prior Publication Data

US 2008/0230654 A1    Sep. 25, 2008

(51) Int. Cl.
B64D 37/02 (2006.01)
B64D 37/04 (2006.01)
B64D 37/12 (2006.01)

(52) U.S. Cl. .................................. 244/135 R
(58) Field of Classification Search ............. 244/36, 244/135 R, 135 B, 135 C, 172.3, 172.2
See application file for complete search history.

(56) References Cited

U.S. PATENT DOCUMENTS

| 5,893,535 | A | 4/1999 | Hawley |
| 5,909,858 | A | 6/1999 | Hawley |
| 6,568,632 | B2 | 5/2003 | Page et al. |
| 6,572,053 | B2 * | 6/2003 | Salas ..................... 244/12.2 |
| 6,666,406 | B2 | 12/2003 | Sankrithi et al. |
| 6,708,924 | B2 | 3/2004 | Page et al. |
| 7,093,798 | B2 * | 8/2006 | Whelan et al. .............. 244/120 |
| 2004/0245382 | A1 * | 12/2004 | Nozaki .................. 244/53 R |
| 2009/0212162 | A1 * | 8/2009 | Ward .................... 244/135 R |

OTHER PUBLICATIONS

Isakowitz et al., International Reference Guide to Space Launch Systems, 1999, p. 511, Third Edition, AIAA, Reston, VA, USA.
Manke, "A New All Gas-Phase Chemical Iodine Laser", http://www.afrlhorizons.com/Briefs/Mar02/DE0106.html, Mar. 2002.

* cited by examiner

Primary Examiner—Timothy D Collins
Assistant Examiner—Valentina Xavier
(74) Attorney, Agent, or Firm—Canady & Lortz LLP; Bradley K. Lortz

(57) ABSTRACT

A toroidal shaped or ring fuel tank located within the loft line of a blended wing body aircraft is disclosed. The ring tank may be used in an aircraft to store liquid hydrogen fuel with a reduced tank weight. The ring tank may be continuous with no tank end domes typically found on cylindrical pressure tanks, reducing tank weight for a given fuel volume. The ring tank configuration avoids increasing the aerodynamic shape of the aircraft and does not encroach on usable passenger or payload areas of the aircraft. In one example the ring tank may be configured in a nose down position such that the forward portion of the ring tank is outside the pressurized cabin area.

20 Claims, 7 Drawing Sheets

20.14

H₂ Gas
(2,400 psi)

4.23

LH₂

1.0

Jet A

Volume 0.36

H₂ Gas
(2,400 psi)

0.36

LH₂

1.0

Jet A

Mass

HYDROGEN FUELED BLENDED WING BODY RING TANK

BACKGROUND OF THE INVENTION

1. Field of the Invention

This invention relates to aircraft. Particularly, this invention relates to fuel tank systems for aircraft.

2. Description of the Related Art

It has been proposed that aircraft will eventually transition to hydrogen fuel for increased efficiency and to reduce emissions. Hydrogen as fuel is more efficient, offering higher energy content per mass. Accordingly, hydrogen promises increased payload and range for aircraft. In addition, hydrogen offers benefits in terms of emissions because it can be produced by electrolysis of water and produces water when it is burned.

FIG. 1 illustrates the volume and mass relationships between gaseous and liquid hydrogen and typical jet fuel. Hydrogen weighs nearly one third as much as typical jet fuels (e.g., kerosene fuels) for an identical amount of energy content. However, hydrogen cooled to a liquid state in high pressure tanks requires approximately four times the volume as kerosene fuels.

Over the years progress has been made in developing the concept of hydrogen fueled aircraft. In 1937, Dr. V. Ohain tested a He—S-2 experimental turbojet engine on hydrogen. The Tupolev Tu 155 laboratory aircraft proved the feasibility of transport aircraft flying on liquid hydrogen and liquid natural gas (LNG) in 1988. In addition, since 1955 multiple studies have been performed by NASA, the U.S. Air Force, Boeing and Lockheed as well as foreign interests (e.g., Germany and Russia). For example, in 1957, U.S. Air Force B-57 bomber flight tests were performed.

However, prior attempts to develop viable aircraft using hydrogen fuel have faced difficulties. For example, prior designs provided an insufficient fuel volume to support a useful payload or acceptable mission range. Also, inefficient aerodynamic shapes typically resulted having large frontal and surface areas. Multiple small tanks with multiple domes added too much additional weight. In addition, fuel tanks may be placed in the path of engine rotor burst trajectory. Additional fuel storage displaces areas typically used for passengers or payload, decreasing the overall utility of the aircraft. Thus, the objective of producing a hydrogen powered aircraft configuration that combines the required fuel volume within an aerodynamically efficient shape, minimizes hydrogen tank weight penalty, and still maintains usable space for aircraft functionality and utility has not been met. Separately, blended wing body aircraft designs have been previously developed, but without focusing on their application to hydrogen fuel aircraft.

U.S. Pat. No. 6,568,632, by Page et al. and issued May 27, 2003 discloses a blended wing body aircraft having a modular body. In one embodiment, the configuration or cargo capacity of the aircraft can be varied by adding or subtracting intermediate body structures rather than by adding or subtracting segments from the lateral sides of the aircraft body. Configuration in this manner preserves key aerodynamic parameters and permits several major components to be used in several aircraft configurations, each of which having a different cargo capacity. In another embodiment, the aircraft is formed from a plurality of laterally-extending body structures. Changes to the cargo capacity of the aircraft is accomplished through the employment of body structures that are wider or narrower. Configuration in this manner provides the aircraft with a structure that is relatively strong and efficient. While the body structures of this embodiment are not shared across a family of variously sized aircraft, the base design of the body structures is readily modifiable to adjust for an increase or decrease in width associated with a desired change to the aircraft's cargo capacity.

U.S. Pat. No. 6,666,406, by Sankrithi et al., issued Dec. 23, 2003, discloses a partial blended wing body airplane configuration combining the advantages of a pure blended wing configuration with the advantages of conventional aircraft design. A blended tri-body airplane configuration wherein three pressurized body elements are connected by and blended with a pressurized centerwing element. The sidebodies and centerbody are blended into the wing structure, producing a multi-body airplane whose body sections are interconnected utilizing wing payload carrying sections.

U.S. Pat. No. 6,708,924, by Page et al., issued Mar. 23, 2004, discloses a blended wing body aircraft having a modular body having a body that includes a plurality of laterally-extending body structures. Changes to the cargo capacity of the aircraft is accomplished through the employment of body structures that are wider or narrower. Configuration in this manner provides the aircraft with a structure that is relatively strong and efficient. While the body structures of this embodiment are not shared across a family of variously sized aircraft, the base design of the body structures is readily modifiable to adjust for an increase or decrease in width associated with a desired change to the aircraft's cargo capacity.

U.S. Pat. No. 5,909,858, by Hawley, issued Jun. 8, 1999, discloses a blended wing-body aircraft includes a central body, a wing, and a transition section which interconnects the body and the wing on each side of the aircraft. The two transition sections are identical, and each has a variable chord length and thickness which varies in proportion to the chord length. This enables the transition section to connect the thin wing to the thicker body. Each transition section has a negative sweep angle.

U.S. Pat. No. 5,893,535, by Hawley, issued Apr. 13, 1999, discloses structural ribs for providing structural support for a structure, such as the pressure cabin of a blended-wing body aircraft. In a first embodiment, the ribs are generally "Y-shaped", being comprised of a vertical web and a pair of inclined webs attached to the vertical web to extend upwardly and outwardly from the vertical web in different directions, with only the upper edges of the inclined webs being attached to a structural element. In a second embodiment, the ribs are generally "trident-shaped", whereby the vertical web extends upwardly beyond the intersection of the inclined webs with the vertical web, with the upper edge of the vertical web as well as the upper edges of the inclined webs being attached to the same structural element.

In view of the foregoing, there is a need in the art for hydrogen powered aircraft configurations that combine the required fuel volume within an aerodynamically efficient shape. There is also a need for such aircraft designs that minimize hydrogen tank weight penalty and still maintain usable space for aircraft functionality and utility. These and other needs are met by the present invention as detailed hereafter.

SUMMARY OF THE INVENTION

A toroidal shaped or ring fuel tank located within the loft line of a blended wing body aircraft is disclosed. The ring tank may be used in an aircraft to store liquid hydrogen fuel with a reduced tank weight. The ring tank may be continuous with no tank end domes typically found on cylindrical pressure tanks, reducing tank weight for a given fuel volume. The ring tank configuration avoids increasing the aerodynamic shape of the aircraft and does not encroach on usable passenger or payload areas of the aircraft. In one example the ring tank may be configured in a nose down position such that the forward portion of the ring tank is below the pressurized cabin area.

A typical embodiment of the invention comprises an aircraft having a blended wing body aircraft structure and a ring tank affixed within the blended wing body aircraft structure, the ring tank for storing a pressurized fluid for the aircraft. Typically, the pressurized fluid comprises a fuel for the aircraft such as liquid hydrogen.

In some embodiments, the aircraft may operate on both hydrogen and conventional fuel (e.g. kerosene based) and the liquid hydrogen is stored in the ring tank. One or more supplemental liquid hydrogen tanks may be disposed within a center area of the ring tank. In addition, one or more wing tanks may be disposed within each wing of the aircraft for storing the conventional fuel.

In one exemplary embodiment, engines for the aircraft may be disposed aft of the ring tank. Further, the engines may be disposed on an upper surface of the blended wing body aircraft structure.

The ring tank is typically disposed within a loft line of the blended wing body aircraft structure such that the ring tank is entirely within the aerodynamic form of the aircraft. The ring tank may intersect a plurality of bulkheads each parallel to a centerline of the aircraft. In some embodiments, the ring tank may intersect at least four bulkheads each parallel to the centerline of the aircraft.

In one exemplary embodiment, the ring tank is disposed in a nose down position with respect to the blended wing body aircraft structure such that a forward portion of the ring tank is outside a pressurized cabin area. The aft portion of the ring tank may be disposed aft of the pressurized cabin area in this case. Further, left and right outboard portions of the ring tank may be disposed within the wing transition area of the blended wing body aircraft structure.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, conventional tube-and-wing aircraft design approach that would employ spherical or cylindrical tanks of sufficient total volume have a number of drawbacks. The usable fuselage cabin space is reduced which also lowers aircraft functionality. In addition, such configurations possess an expanded fuselage aerodynamic cross section with frontal and surface areas, resulting in increased drag. Furthermore, it is commonly necessary to package multiple small tanks into the available wing and fuselage areas, which increases the aircraft weight.

Some of the benefits of packaging sufficient fuel volume within an efficient aerodynamic cross-section include decreased emissions and increased payload and/or range performance. Previous techniques for aircraft fuel storage involved tube-and-wing aircraft with cylindrical hydrogen tanks which contained an insufficient fuel volume, an inefficient aerodynamic cross section, or an unacceptable weight.

A significant technical advantage of embodiments of the invention is to obtain an aircraft fuel tank arrangement that provides sufficient fuel volume within an efficient aerodynamic cross-section. Aircraft employing embodiments of the invention can yield a significant vehicle-level performance advantage. For example, embodiments of the invention employing hydrogen fuel within the ring tank will possess reduced aircraft emissions and can obtain increased payload range over conventional aircraft.

Embodiments of the invention enable efficient storage of hydrogen fuel, which will satisfy a zero emissions goal. This is particularly important because future aircraft sales may be dependant on meeting increasingly strict environmental requirements under various laws, and treaties.

Although embodiments of the invention are useful for fuel tanks (particularly for liquid hydrogen fuel) as described herein, embodiments of the invention are not limited to such applications. Embodiments of the invention with tanks and structure configured as described herein may generally be employed in an aircraft to hold a pressurized fluid (gas or liquid) for any other purpose as well as will be understood by those skilled in the art. For example, a properly configured ring tank can carry constituents for new high-energy weapon systems, e.g. to generate a laser beam.

2. Blended Wing Body Aircraft

Figure 1:
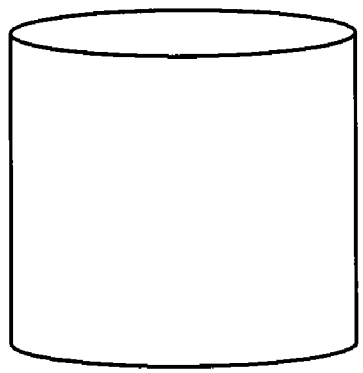
FIG. 1 illustrates the volume and mass relationships between gaseous and liquid hydrogen and typical jet fuel.
Figure 1:
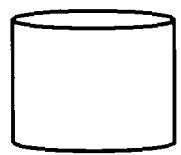
Figure 1:
Figure 1:
Figure 1:
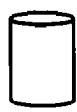
Figure 1:
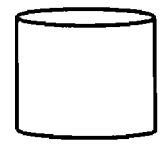
Figure 2B:
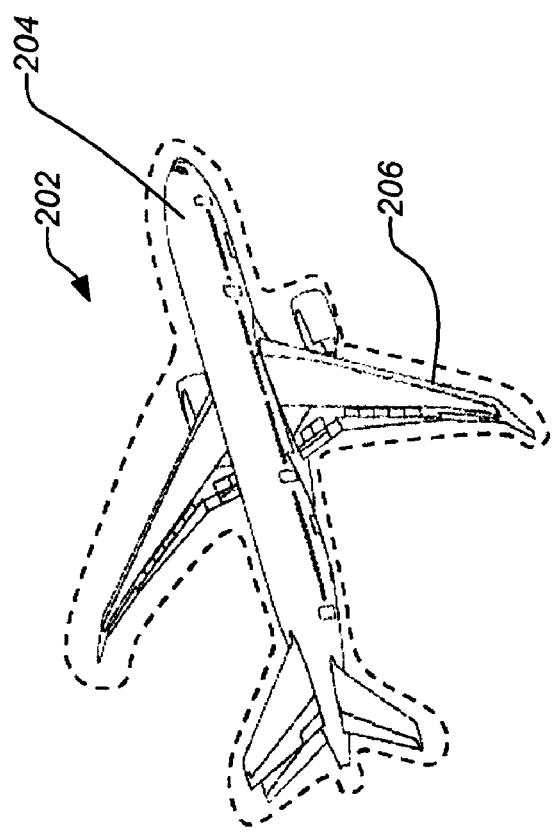
FIGS. 2A and 2B illustrate the relative relationship between frontal area and surface area, respectively, for a conventional aircraft design.
Figure 2A:
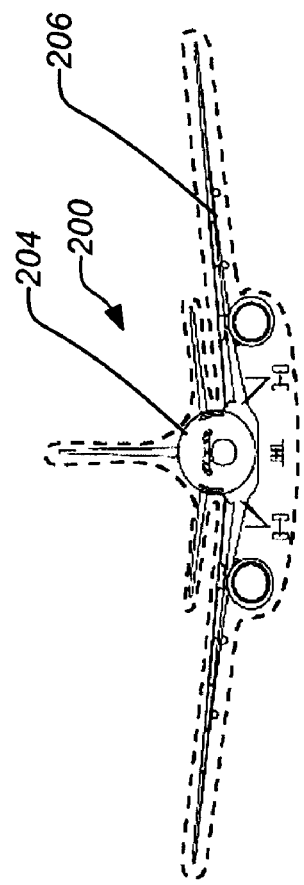

FIGS. 2A and 2B illustrate the relative relationship between frontal area and surface area, respectively, for a conventional aircraft design. The frontal area 200 may be defined as the projected area from a front view of the aircraft. The surface area 202 may be defined as the total area of the surface of the aircraft. Efficient aircraft designs possess relatively small frontal area 200 and surface area 202. A conventional aircraft design approach utilizes a very narrow body 204 (i.e. fuselage) to minimize its contribution to the frontal area. Under this approach, the body 204 may be lengthened without adding anything to the frontal area 200. However, lengthening the body 204 also does not contribute any significant additional lift which is the isolated function of the wings 206. In contrast, the blended body wing approach merges the functions of the aircraft body and wings. Wetted area refers to the actual surface area of an aerodynamic shape that is contacting the air flow as is known in the art.

Figure 3B:
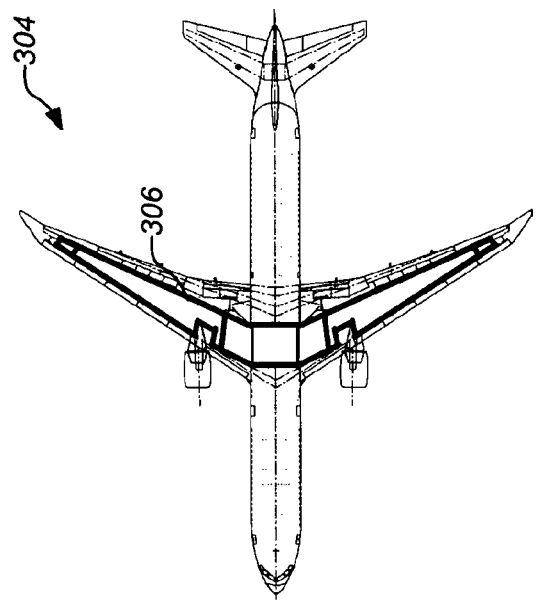
FIGS. 3A and 3B illustrate an exemplary blended wing body aircraft structure and a conventional aircraft structure, respectively, showing available internal volumes within wing transition areas.
Figure 3C:
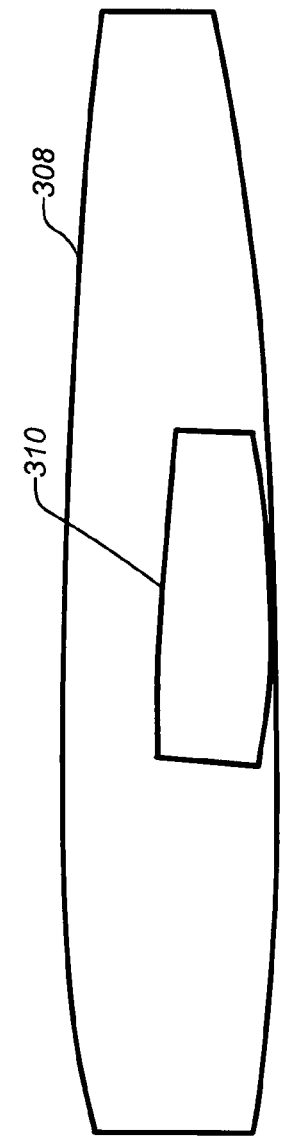
FIG. 3C illustrate the relative relationship between available internal volumes within wing transition areas for the exemplary wing body blended aircraft structure and the conventional aircraft structure of FIGS. 3A and 3B.
Figure 3A:
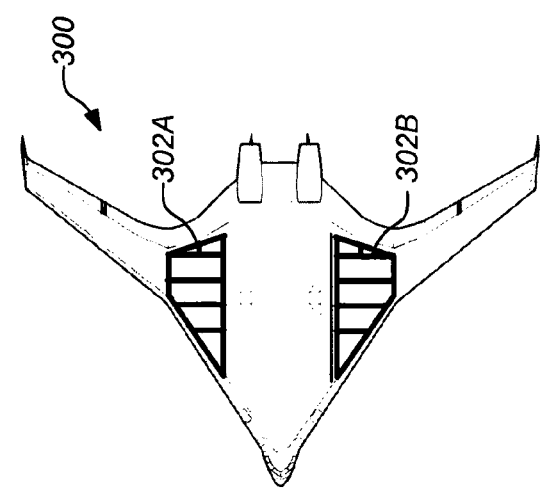

FIGS. 3A and 3B illustrate an exemplary blended wing body aircraft structure 300 and a conventional aircraft structure 304, respectively, showing available internal volumes 302A, 302B, 306 within wing transition areas. FIG. 3B shows the structure 304 of an example Boeing 767-400ER aircraft. One benefit of the blended wing body design approach is that a significantly greater amount of internal volume for the aircraft is developed for a marginal cost (if any) of additional surface area. As shown in compared structures 300, 304 of FIGS. 3A and 3B there is an excess of available internal volume created within the transition area between the wing and body for the blended wing body aircraft structure 300 of FIG. 3A. However, this may not be apparent from the top down views of FIGS. 3A and 3B.

FIG. 3C illustrate the relative relationship between available internal volumes within wing transition areas for the exemplary wing body blended aircraft structure and the conventional aircraft structure of FIG. 3A and 3B. A cross section 308 of the blended wing body internal volumes 302A, 302B from a side view is superimposed on a cross section 310 of the conventional aircraft internal volume 306.

Figure 4B:
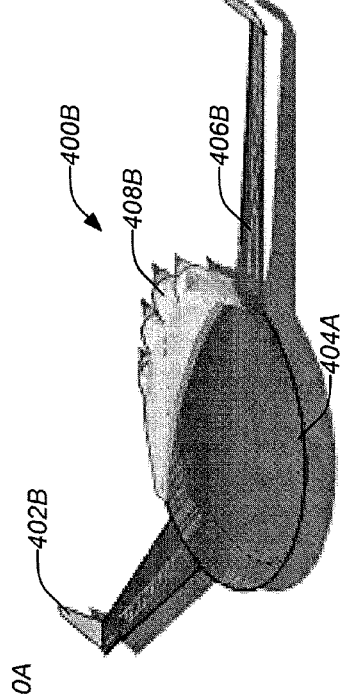
FIGS. 4A & 4B illustrate comparative aerodynamic efficiencies for a conventional aircraft structure and an exemplary blended wing body aircraft structure, respectively.
Figure 4D:
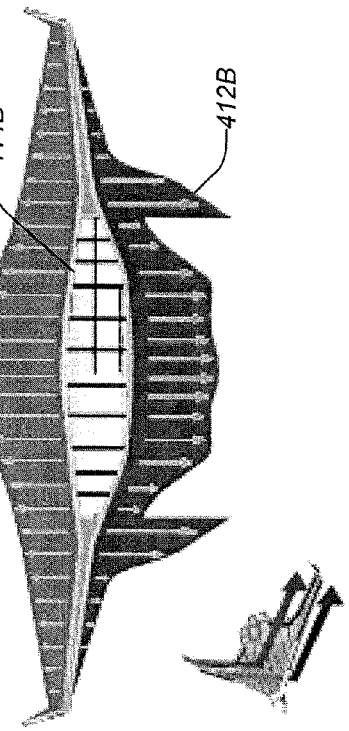
FIGS. 4C & 4D illustrate comparative structural efficiencies for a conventional aircraft structure and an exemplary blended wing body aircraft structure of FIGS. 4A & 4B, respectively.
Figure 4A:
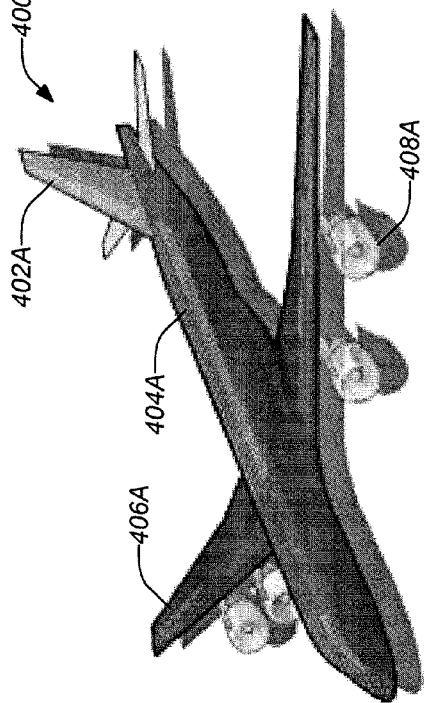

FIG. 4A & 4B illustrate comparative aerodynamic efficiencies for a conventional aircraft structure 400A and an exemplary blended wing body aircraft structure 400B, respectively. Wetted areas of distinct portions of the two structures 400A, 400B may be compared. The empennage wetted areas 402A, 402B for the example blended wing body structure 400A and the convention aircraft structure 400B are approximately 5,000 ft 2 and 500 ft 2, respectively. The fuselage wetted areas 404A, 404B for the example blended wing body structure 400A and the convention aircraft structure 400B are approximately 23,000 ft 2 and 22,000 ft 2, respectively. Similarly, the wing wetted areas 406A, 406B are approximately 12,000 ft 2 and 6,000 ft 2, respectively, and the propulsion wetted areas 408A, 408B are 4,000 ft 2 and 1,200 ft 2, respectively. Thus, the total wetted area for the blended wing body structure 400A is approximately 33% lower than that of the conventional aircraft structure 400B, exhibiting improved aerodynamic efficiency with a blended wing body aircraft structure 400B.

Figure 4C:
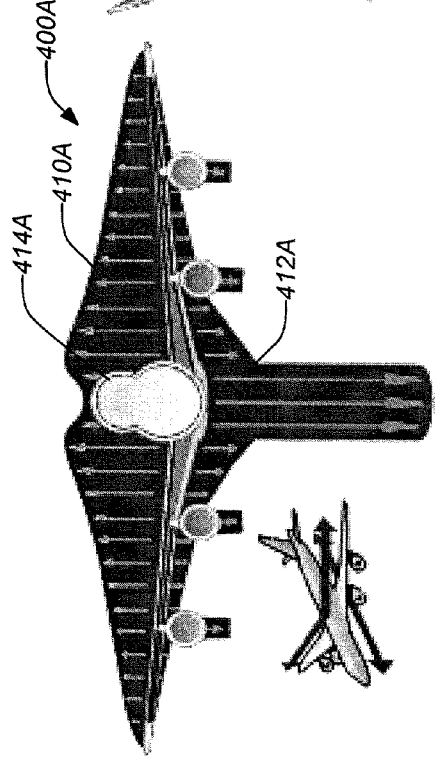

FIGS. 4C & 4D illustrate comparative structural efficiencies for the conventional aircraft structure 400A and the exemplary blended wing body aircraft structure 400B of FIGS. 4A & 4B, respectively. The aerodynamic lift profiles 410A, 410B support the inertial load profiles 412A, 412B, respectively. Plainly, the inertial load and aerodynamic lift profiles are more evenly matched for the blended wing body aircraft structure 400B. The blended wing body fuselage adds to the lift profile, whereas the conventional fuselage does not. Similarly, the conventional fuselage is responsible for most of the inertial load, whereas the inertial load is distributed across the blended wing body fuselage. The different fuselage configurations result in different pressure loading 414A, 414B within the pressurized cabins, a circular cross section for the conventional aircraft versus a flattened cross section for the blended wing body aircraft. Finally, the inertial load is distributed normal to the lift profile (i.e. into the page) for a conventional aircraft, whereas a blended body wing aircraft has an inertial load that is distributed along its lift profile. Thus, the blended wing body aircraft structure 400B obtains improved structural efficiency over that of the conventional aircraft structure 400A.

3. Ring Tank for a Blended Wing Body Aircraft

The foregoing understanding of the advantages of a blended wing body aircraft structure can be applied to the objective of producing an optimized aircraft structure for a hydrogen fueled aircraft. It should be noted that although embodiments of the invention are particularly useful for hydrogen fueled aircraft, they are not limited to such applications. Embodiments of the invention may also be applied to aircraft using conventional kerosene fuels or any other fuel requiring tank storage. Furthermore, embodiments of the invention are also generally applicable to the storage of any pressurized fluid (gas or liquid) on an aircraft. For example, constituents for a high-energy weapons, such as a laser beams, may also be stored on board an aircraft using an embodiment of the invention. Some example lasers include a hydrogen fluoride (HF) laser using molecular fluorine, a chemical oxygen-iodine laser (COIL) using basic hydrogen peroxide, and an all gas-phase iodine laser (AGIL) using chlorine and gaseous hydrogen azide.

Embodiments of the invention may also employ a combination of tanks in addition to the ring tank. For example, supplemental tanks (saddle tanks) may be disposed in the interior region of the ring tank. Embodiments of the invention may also be implemented along with conventional wing tanks. Additional tanks also enable applications for hybrid aircraft that employ mixed fuel engines which run on both hydrogen and conventional fuel (e.g. kerosene based). Such engines have already been developed and flown. In one example, conventional fuel (e.g., kerosene based) may be carried in supplemental wing tanks (i.e., wing tanks configured as in a conventional approach) while hydrogen fuel is carried in the ring tank (and possibly supplemental saddle tanks as well).

As previously discussed, blended wing body aircraft resembles a flying wing, except that it has a large semi-flat fuselage "blended" into the center. Compared to comparably sized tube-and-wing airplanes, a jet fuel-powered blended wing body typically has 50% more internal fuel volume than needed for a mission. Thus, the incremental increase in fuel volume required for a blended wing body aircraft powered by liquid hydrogen is less than required for conventional configurations.

Embodiments of the invention may feature a toroidal shaped ring tank located within the loft line of a blended wing body aircraft. A loft line may be defined as a theoretical outside surface of an aerodynamic surface used for defining a common reference datum for aerodynamic and structures groups to work to. The ring tank is continuous, with no tank end-domes typically found on cylindrical pressure tanks. For a given fuel volume, this greatly reduces the total tank weight versus multiple tanks that each have their own end domes. In two example structures, the ring tank may be oriented horizontal or nearly horizontal with the forward portion slightly lower than the aft portion.

It is important to note that a ring tank as employed in embodiments of the invention is not strictly limited to true toroidal shape having a circular cross section and closed circular path. Although this geometry may present the most structurally efficient configuration, embodiments of the invention encompass other configurations as well as will be understood by those skilled in the art. For example, embodiments of the invention may include ring tanks having any continuously-extending closed shape including oval, oblong, generally rectangular, or non-uniform. Similarly, the cross section may be formed into noncircular shapes, e.g. oval, rectangular with semicircular ends, etc. In some cases, relatively small, isolated deviation from the ideal toroid ring tank shape may be necessary in some designs to accommodate structural elements of the overall blended wing body aircraft. Such deviations or alternate ring tank configurations will require additional strengthening of the ring tank in the affected areas as will be understood by those skilled in the art.

Figure 5A:
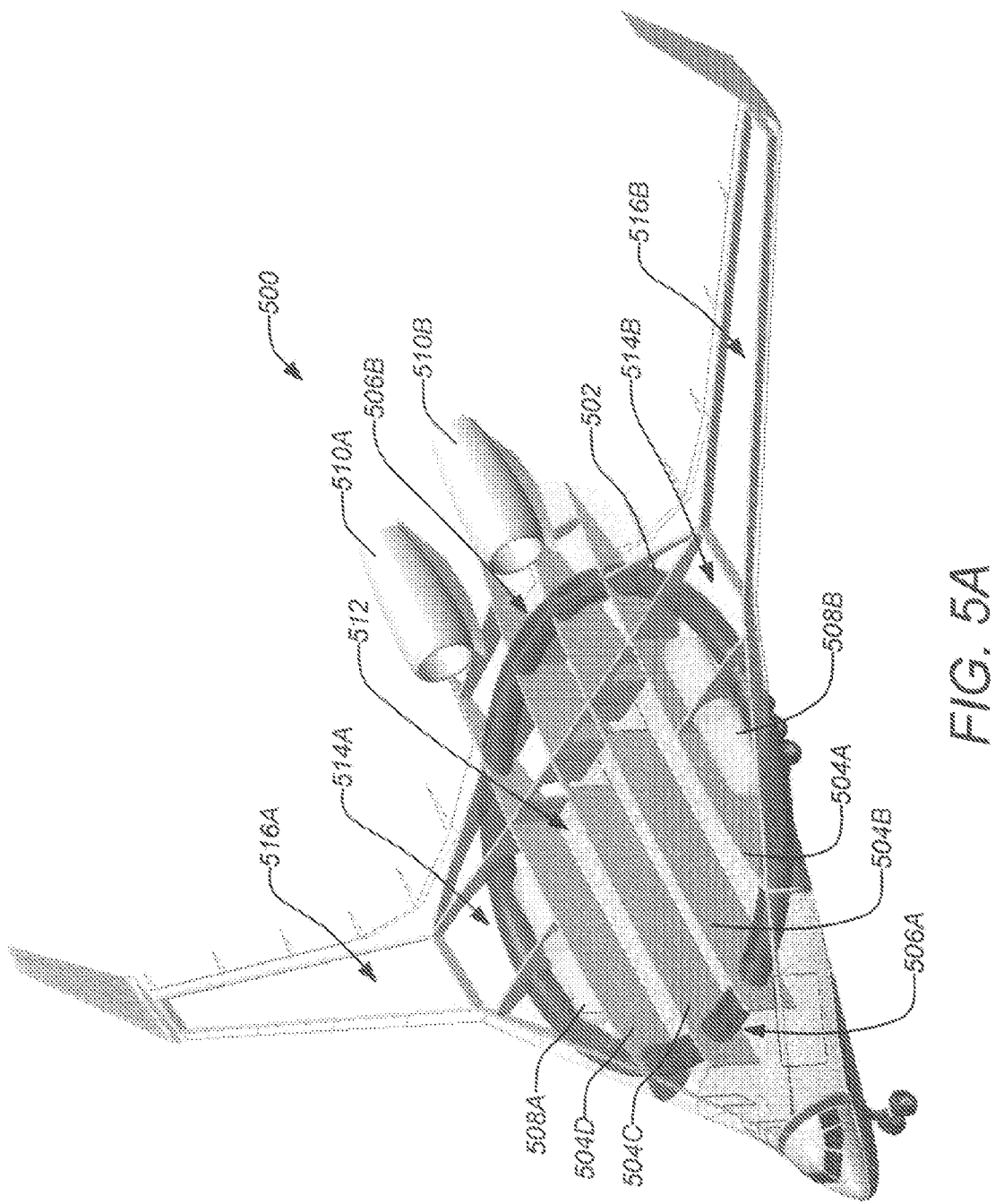
FIG. 5A illustrates an exemplary embodiment of the invention employing a ring tank within a blended body wing aircraft structure.

FIG. 5A illustrates an exemplary embodiment of the invention employing a ring tank 502 within a blended body wing aircraft structure 500. The closed ring tank 502 for storing fuel for the aircraft is affixed within the blended wing body aircraft structure 500. The ring tank 502 may be disposed with a loft line of the blended wing body aircraft structure 500 such that the ring tank 502 is entirely within the aerodynamic form of the aircraft. This may be desirable because it is unnecessary to make any interruptions in the aerodynamic form to accommodate the ring tank 502. Typically, the ring tank 502 will intersect a plurality of bulkheads 504A-504D, each parallel to a centerline of the aircraft structure 500. The widened pressurized cabin area within the aircraft structure 500 requires a number of bulkheads 504A-504D which must be traversed by the ring tank 502. For example, the ring tank may intersect at least four such bulkheads 504A-504D across both the forward and aft portions 506A, 506B of the ring tank 502. The ring tank 502 may be oriented such that it is outside of the pressurized cabin 512. The outboard sections of the ring may be in the wing transition area outboard of the pressurized cabin 512 as shown. The left and right outboard portions 514A, 514B of the ring tank 502 are disposed within a wing transition area of the blended wing body aircraft structure 500.

In addition, supplemental wing tanks 516A, 516B may be located within the wing to further enhance total fuel volume for the aircraft structure 500. Additionally or alternately, supplemental saddle tanks 508A, 508B may be disposed within a center area of the ring tank 502. These tanks 516A, 516B, 508A, 508B may be of a conventional shape, e.g. wing, cylindrical, spherical, or any other useful shape. As previously mentioned, the multiple supplemental tanks 516A, 516B, 508A, 508B may be used to support a hybrid engine operating on both hydrogen and conventional fuel (as well as other application such as high energy weapons).

In one embodiment, the blended wing body aircraft structure 500 may employ engines 510A, 510B disposed aft of the ring tank 502. Thus, the aft portion 506B of the ring tank 502 is forward of the engines, but aft of the pressurized cabin 512. For example, the engines 510A, 510B may be located near the centerline on the aft upper surface of the blended wing body aircraft structure 500. The ring tank 502 may be located well forward of the engines 510A, 510B to reduce the fuel hazard by placing it out of the fragment trajectory from a potential engine rotor burst. This is in contrast to most conventional tube-and-wing aircraft structures, which employ engines located on the wings.

Figure 5B:
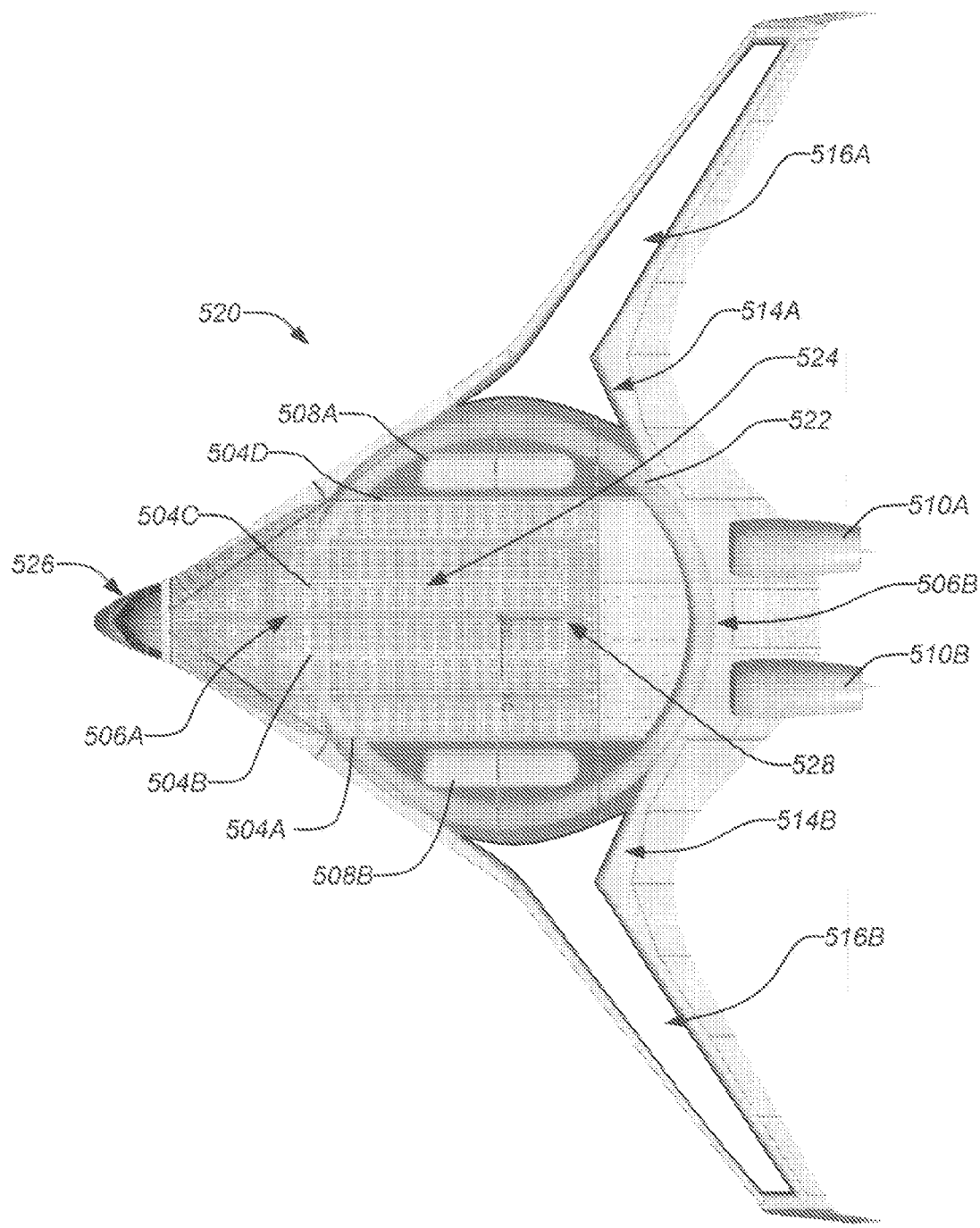
FIG. 5B illustrates another exemplary embodiment of the invention employing a ring tank having a nose down configuration within a blended body wing aircraft structure.

FIG. 5B illustrates another exemplary embodiment of the invention employing a ring tank 522 having a nose down configuration within a blended body wing aircraft structure 520. This embodiment may employ all the essential features previously described with respect to the blended wing body aircraft structure 500 of FIG. 5A, however in this case, the forward portion 506A of the ring tank 522 may pass outside (e.g., below) the main deck area of the pressurized cabin 524. This configuration affords the aircraft structure 520 a continuous pressurized cabin 524 from the cockpit 526 to the aft section 528.

Figure 5C:
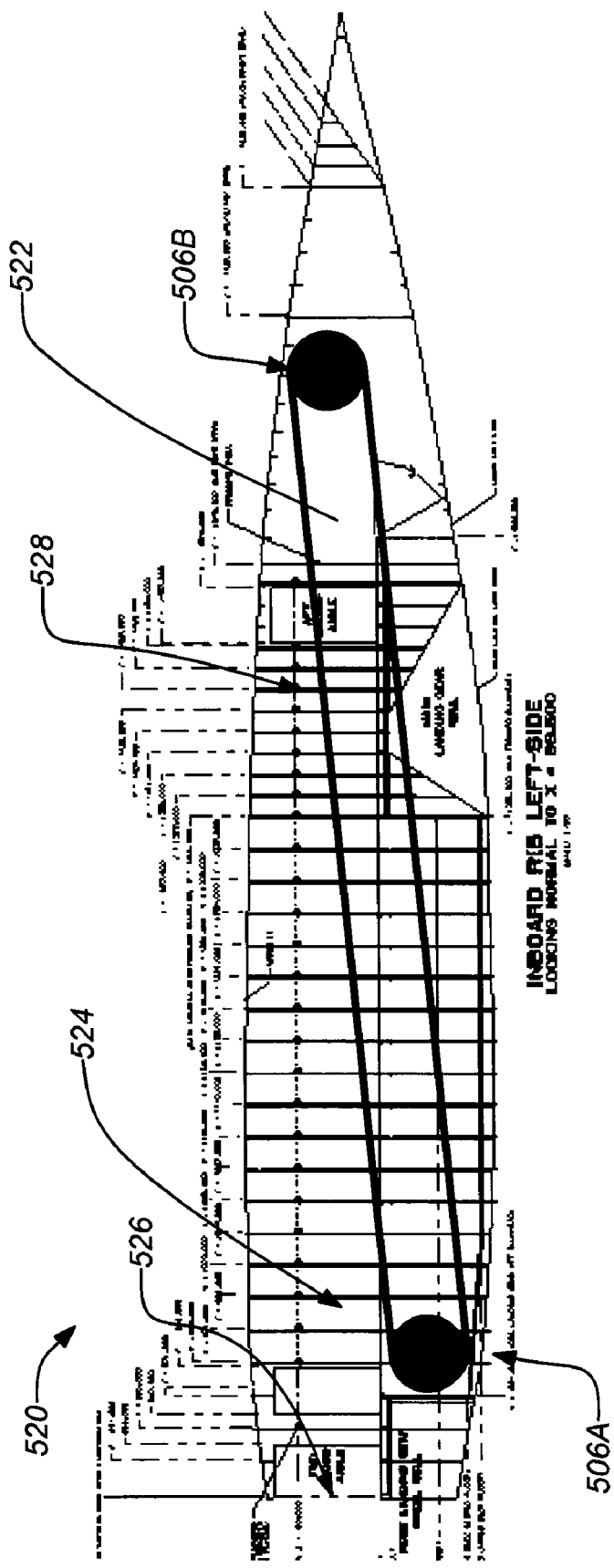
FIG. 5C illustrates a side view of the embodiment of FIG. 5B employing a ring tank having a nose down configuration within a blended body wing aircraft structure.

FIG. 5C illustrates a side view of the embodiment of FIG. 5B employing a ring tank 522 having a nose down configuration within a blended body wing aircraft structure 520. In this view the forward portion of the ring tank 522 is more clearly shown passing outside the continuous pressurized cabin 524 allowing clear passage from the cockpit 526 to the aft section 528.

Thus, embodiments of the invention are generally directed to using a ring tank within a blended wing body aircraft structure. Embodiments of the invention can be used to store liquid hydrogen fuel with a reduced overall tank weight and other advantages previously described. In addition, embodiments can achieve this without any significant increase in the aerodynamic shape of an aircraft. Furthermore, embodiments of the invention can employ a ring tank configuration that does not encroach on pressurized regions of the aircraft (e.g., useable passenger and/or payload areas).

Previous hydrogen powered prototype aircraft and studies were directed to conventional tube-and-wing aircraft configurations with spherical or cylindrical hydrogen tanks. Accordingly, all prior work yielded aircraft designs having an insufficient fuel volume or an inefficient aerodynamic cross section.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An aircraft comprising:
   a blended wing body aircraft structure; and
   a ring tank affixed within the blended wing body aircraft structure, the ring tank for storing a pressurized fluid;
   wherein the ring tank is disposed within a loft line of the blended wing body aircraft structure such that the ring tank is entirely within an aerodynamic form of the aircraft and the ring tank is disposed in a nose down position with respect to the blended wing body aircraft structure such that a forward portion of the ring tank is outside a pressurized cabin area.

2. The aircraft of claim 1, wherein the pressurized fluid comprises a fuel for the aircraft.

3. The aircraft of claim 2, wherein the fuel for the aircraft comprises liquid hydrogen.

4. The aircraft of claim 3, wherein the aircraft operates on both hydrogen and conventional fuel and the liquid hydrogen is stored in the ring tank.

5. The aircraft of claim 4, further comprises one or more supplemental liquid hydrogen tanks disposed within a center area of the ring tank.

6. The aircraft of claim 5, further comprises one or more wing tanks disposed within each wing of the aircraft for storing the conventional fuel.

7. The aircraft of claim 1, wherein engines for the aircraft are disposed aft of the ring tank.

8. The aircraft of claim 7, wherein the engines are further disposed on an upper surface of the blended wing body aircraft structure.

9. The aircraft of claim 1, wherein the ring tank intersects a plurality of bulkheads each parallel to a centerline of the aircraft.

10. The aircraft of claim 9, wherein the ring tank intersects at least four bulkheads each parallel to the centerline of the aircraft.

11. The aircraft of claim 1, wherein an aft portion of the ring tank is aft of the pressurized cabin area.

12. The aircraft of claim 1, wherein left and right outboard portions of the ring tank are disposed within a wing transition area of the blended wing body aircraft structure.

13. The aircraft of claim 1, wherein the ring tank intersects a plurality of bulkheads each parallel to a centerline of the aircraft.

14. An aircraft comprising:

a blended wing body aircraft structure; and a ring tank means for storing a pressurized fluid, the ring tank means affixed within the blended wing body aircraft structure;

wherein the ring tank means is disposed in a nose down position with respect to the blended wing body aircraft structure such that a forward portion of the ring tank is outside a pressurized cabin area.

15. The aircraft of claim 14, wherein the pressurized fluid comprises a fuel for the aircraft.

16. The aircraft of claim 15, wherein the fuel for the aircraft comprises liquid hydrogen.

17. The aircraft of claim 16, wherein the aircraft operates on both hydrogen and conventional fuel and the liquid hydrogen is stored in the ring tank.

18. The aircraft of claim 14, further comprises one or more supplemental fuel tanks disposed within a center area of the ring tank means.

19. The aircraft of claim 14, wherein engines for the aircraft are disposed aft of the ring tank.

20. The aircraft of claim 19, wherein the engines are further disposed on an upper surface of the blended wing body aircraft structure.

\* \* \* \* \*